United States Patent
Chun et al.

(10) Patent No.: US 11,909,054 B2
(45) Date of Patent: Feb. 20, 2024

(54) ALUMINUM POUCH FILM FOR SECONDARY BATTERY, AND MANUFACTURING METHOD THEREFOR

(71) Applicant: BTL ADVANCED MATERIAL CO. LTD., Hwaseong-si (KR)

(72) Inventors: Sang Wook Chun, Hwaseong-si (KR); Jun Ho Shim, Seoul (KR); Soon Sik Lee, Cheongju-si (KR)

(73) Assignee: BTL ADVANCED MATERIAL CO. LTD., Hwaseong-si (KR)

( * ) Notice: Subject to any disclaimer, the term of this patent is extended or adjusted under 35 U.S.C. 154(b) by 0 days.

(21) Appl. No.: 17/632,855

(22) PCT Filed: Aug. 6, 2020

(86) PCT No.: PCT/KR2020/010451
§ 371 (c)(1),
(2) Date: Feb. 4, 2022

(87) PCT Pub. No.: WO2021/025513
PCT Pub. Date: Feb. 11, 2021

(65) Prior Publication Data
US 2022/0271373 A1    Aug. 25, 2022

(30) Foreign Application Priority Data
Aug. 6, 2019   (KR) .................. 10-2019-0095787

(51) Int. Cl.
*H01M 50/126*   (2021.01)
*H01M 50/131*   (2021.01)
(Continued)

(52) U.S. Cl.
CPC ............. *H01M 50/126* (2021.01); *B32B 7/12* (2013.01); *B32B 15/085* (2013.01);
(Continued)

(58) Field of Classification Search
None
See application file for complete search history.

(56) References Cited

U.S. PATENT DOCUMENTS

| 4,959,121 A | 9/1990 | Dumas et al. |
| 6,461,757 B1 * | 10/2002 | Sasayama ........... H01M 50/121 429/211 |

(Continued)

FOREIGN PATENT DOCUMENTS

| CN | 102602597 A | 7/2012 |
| JP | 7-165915 A | 6/1995 |

(Continued)

OTHER PUBLICATIONS

PolymerDatabase—Polyamide—May 30, 2023 (Year: 2023).*

(Continued)

*Primary Examiner* — John Vincent Lawler
(74) *Attorney, Agent, or Firm* — Sughrue Mion, PLLC

(57) ABSTRACT

An aluminum pouch film for a secondary battery and a method for manufacturing the aluminum pouch film are disclosed. The aluminum pouch film includes an aluminum layer; an outer resin layer formed on a first surface of the aluminum layer; an inner resin layer formed on a second surface of the aluminum layer; and an adhesive layer for adhering the aluminum layer to the inner resin layer, wherein the outer resin layer includes a copolymer of polyamide and polyimide.

6 Claims, 1 Drawing Sheet

(51) Int. Cl.

| | | |
|---|---|---|
| *H01M 50/121* | (2021.01) | |
| *H01M 50/105* | (2021.01) | |
| *H01M 50/119* | (2021.01) | |
| *B32B 7/12* | (2006.01) | |
| *B32B 15/085* | (2006.01) | |
| *B32B 15/088* | (2006.01) | |
| *B32B 15/20* | (2006.01) | |
| *B32B 27/28* | (2006.01) | |
| *B32B 27/32* | (2006.01) | |
| *B32B 27/34* | (2006.01) | |
| *B32B 37/12* | (2006.01) | |
| *B32B 37/18* | (2006.01) | |

(52) U.S. Cl.
CPC ............ *B32B 15/088* (2013.01); *B32B 15/20* (2013.01); *B32B 27/281* (2013.01); *B32B 27/32* (2013.01); *B32B 27/34* (2013.01); *B32B 37/12* (2013.01); *B32B 37/185* (2013.01); *H01M 50/105* (2021.01); *H01M 50/119* (2021.01); *H01M 50/121* (2021.01); *H01M 50/131* (2021.01); *B32B 2250/03* (2013.01); *B32B 2255/06* (2013.01); *B32B 2255/26* (2013.01); *B32B 2307/306* (2013.01); *B32B 2307/71* (2013.01); *B32B 2307/714* (2013.01); *B32B 2311/24* (2013.01); *B32B 2323/10* (2013.01); *B32B 2377/00* (2013.01); *B32B 2379/08* (2013.01); *B32B 2457/10* (2013.01)

(56) References Cited

U.S. PATENT DOCUMENTS

| | | | |
|---|---|---|---|
| 2002/0142178 A1 | 10/2002 | Yamashita et al. | |
| 2014/0234689 A1* | 8/2014 | Kim | B32B 7/12 |
| | | | 429/120 |
| 2015/0214515 A1 | 7/2015 | Lai et al. | |
| 2016/0087250 A1 | 3/2016 | Gu et al. | |
| 2016/0114563 A1* | 4/2016 | Underwood | B32B 15/082 |
| | | | 428/419 |
| 2017/0229685 A1 | 8/2017 | Hashimoto et al. | |
| 2017/0288181 A1* | 10/2017 | Hwang | H01M 4/587 |
| 2017/0301890 A1* | 10/2017 | Maeda | H01M 50/121 |
| 2018/0287220 A1 | 10/2018 | Woodford et al. | |

FOREIGN PATENT DOCUMENTS

| | | | | |
|---|---|---|---|---|
| JP | H07/165915 | * | 6/1995 | ............ C08G 69/32 |
| JP | H07/165915 A | * | 6/1995 | ............ C08G 69/32 |
| JP | H07-165915 A | † | 6/1995 | |
| JP | 2000-6312 A | | 1/2000 | |
| JP | 2019/034476 A | * | 3/2019 | ............ B32B 15/088 |
| JP | 2019-34476 A | | 3/2019 | |
| JP | 2019/034476 | * | 7/2019 | ............ B23B 15/088 |
| KR | 10-2000-0076434 A | | 12/2000 | |
| KR | 10-2001-0102093 A | | 11/2001 | |
| KR | 10-2013-0011977 A | | 1/2013 | |
| KR | 2014/0048602 | * | 4/2014 | ............ B23B 15/08 |
| KR | 10-2014-0134185 A | | 11/2014 | |
| KR | 10-2016-0077969 A | | 7/2016 | |
| KR | 10-2016-0100604 A | | 8/2016 | |
| KR | 2016/0100604 | * | 8/2016 | ............ H01M 10/05 |
| KR | 10-2016-0129595 A | | 11/2016 | |
| KR | 2016/0129595 | * | 11/2016 | ............ H01M 10/04 |
| KR | 10-2017-0142622 A | | 12/2017 | |
| WO | 2006/111182 A1 | | 10/2006 | |
| WO | 2016111182 A1 | † | 7/2016 | |

OTHER PUBLICATIONS

PolymerDatabase—Polyimide—May 30, 2023 (Year: 2023).*
PolymerDatabase—Polyamideimide—May 30, 2023 (Year: 2023).*
Toyobo—VYLOMAX—May 30, 2023 (Year: 2023).*
Mizouchi—JP H07-165915 A—D2—MT—polyamideimide as copolymer—1995 (Year: 1995).*
Hong—KR 2014-0048602 A—MT—secondary battery w—polyamideimide copolymer—2014 (Year: 2014).*
Ham—KR 2016-0100604 A—Euro D2—MT—battery laminate—no PAI—2016 (Year: 2016).*
Nam—KR 2016-0129595 A—Euro D3—MT—Pouch-type secondary battery—PAI is inner layer—2016 (Year: 2016).*
Shibata—JP 2019-034476 A—MT—polyamideimide on foil—Mar. 2019 (Year: 2019).*
International Searching Authority, International Search Report of PCT/KR2020/010451 dated Nov. 10, 2020 [PCT/ISA/210].
Communication dated Sep. 26, 2023 issued by the Korean Patent Office in KR application No. 10- 2022-0043539.

* cited by examiner
† cited by third party

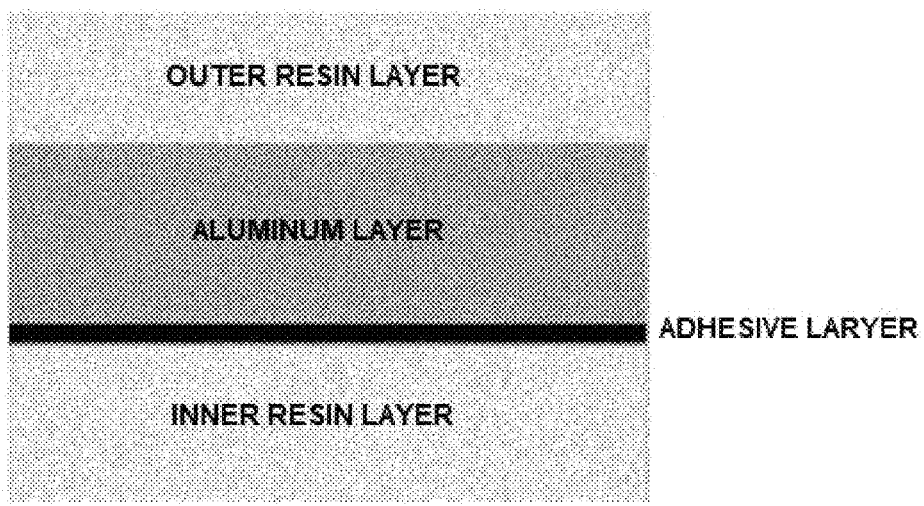

ALUMINUM POUCH FILM FOR SECONDARY BATTERY, AND MANUFACTURING METHOD THEREFOR

CROSS REFERENCE TO RELATED APPLICATIONS

This application is a National Stage of International Application No. PCT/KR2020/010451, filed Aug. 6, 2020, claiming priority to Japanese Patent Application No. 10-2019-0095787, filed Aug. 6, 2019, the contents of all of which are incorporated herein by reference in their entirety.

TECHNICAL FIELD

The present invention relates to an aluminum pouch film for a secondary battery, and a manufacturing method therefor, and more particularly, to an aluminum pouch film for a secondary battery having significantly improved chemical resistance, heat resistance and electrolyte liquid resistance compared to packaging films used in the art, and a manufacturing method therefor.

BACKGROUND ART

A secondary battery, an electrochemical device recently used for supplying power to various electronic and electrical products, normally refers to a lithium secondary battery, and means a battery having a polymer electrolyte and generating a current through lithium ion migration. As a packaging exterior material used for protecting such a secondary battery, a pouch film in which polymer and metal are laminated is used. Such a pouch film for a secondary battery has a form having an aluminum thin film provided in between in order to protect a battery cell formed with an electrode assembly and an electrolyte liquid filled therein by a subsequent process, and to stably maintain electrochemical properties and the like of the cell, and in order to protect the battery cell from external impact, a polyethylene terephthalate (PET) resin, a nylon film or the like is formed on the aluminum thin film as an outer resin layer.

In the pouch film, an upper pouch film and a lower pouch film are bonded on the outer peripheral surface by thermal bonding or the like, and between a lower surface of the upper pouch film and an upper surface of the lower pouch film, an adhesive layer made of a thermoplastic polyolefin such as polyethylene (PE) or polypropylene (PP) or a copolymer thereof is formed.

A pouch film is generally formed in a predetermined layered structure having an order of an inner resin layer in direct contact with an electrolyte liquid, a second adhesive layer, an aluminum layer, a first adhesive layer and an outer resin layer in direct contact with the outside.

A pouch-type secondary battery formed in the above-described structure may be damaged for various reasons under various circumstances. For example, in the process of storing the electrode assembly inside the pouch, a protruding portion such as an electrode tap or an electrode lead causes damage such as cracks on the pouch inner layer, and the aluminum layer may be exposed due to such damage.

In addition, heat is applied from the outside when heat sealing the pouch film, and by this heat, pin-holes are generated or damage is caused resulting in cracks on the inner adhesive layer, and the aluminum layer may be exposed to an electrolyte liquid or the like.

In addition to the above-described reasons, the adhesive layer formed in a thin film form may be damaged by dropping, impact, pressure, compression or the like, and through the damaged part, the aluminum layer is exposed to an electrolyte liquid or the like.

The aluminum layer exposed to an electrolyte liquid as above may be corroded as the electrolyte liquid penetrated or diffused into the battery causes a chemical reaction with oxygen or moisture, which leads to a problem of generating a corrosive gas and thereby causing swelling that expands inside the battery.

More specifically, $LiPF_6$ may react with water and oxygen to generate hydrofluoric acid (HF), a corrosive gas. Such hydrofluoric acid may react with aluminum to cause a rapid exothermic reaction, and, as a secondary reaction, is adsorbed on the aluminum surface and penetrates into the system. This increases brittleness of the system resulting in cracks in the pouch film even with micro impact, and herein, lithium and the atmosphere may react due to electrolyte liquid leakage causing ignition.

Accordingly, various aluminum surface modification techniques have been studied to prevent contact with aluminum in the center part even when corrosive hydrofluoric acid is generated as above. As the aluminum surface modification technique, heat treatment, or other conversion treatments, sol-gel coating, primer treatment, treatments with corona, plasma or the like may be included.

However, with the recent trend of gradual increases in the capacity of secondary batteries, aluminum surface modification alone has limits in resolving such problems, and needs for an aluminum pouch film for a secondary battery having excellent chemical resistance, durability, electrolyte liquid resistance and formability have been consistently emerging.

In addition, as the scope of applications for secondary batteries expands to shipbuilding industry, aviation industry and the like as well as electric vehicle industry, on which studies have been conducted for some time, research and development for using high-capacity secondary batteries has been actively conducted.

However, weak chemical resistance and electrolyte liquid resistance have been raised as problems to use a nylon film vulnerable to harsh environments such as high temperature, high salt, high humidity and ultraviolet rays in a pouch film of a high-capacity secondary battery as an outer resin layer. For example, when exposed to moisture including high salt due to cracks in a pouch film, there have been problems such as decline in properties of the nylon film, generation of corrosive gases, or possibility of aluminum in the inner center part, and salt and moisture being brought into contact with each other and reacting. A problem such that peeling or delamination is not prevented with a polyurethane-based adhesive under the above-described conditions has also been raised.

Accordingly, a method of laminating a polyimide film having excellent chemical resistance and heat resistance as an outer resin layer instead of an existing nylon film has been proposed, however, there has been a problem of decreased adhesive strength when laminating a polyimide film as an outer resin layer. In order to overcome such a problem, studies on a method of laminating a polyimide film on an aluminum layer without decreasing adhesive strength under conditions of high temperature, high salt, high humidity and ultraviolet rays have been required.

PRIOR ART DOCUMENT

Patent Document (Patent Document 1) Korean Laid-open Patent Publication No. 10-2001-7010231 (Nov. 15, 2001), "Packaging Material for Polymer Cell and Method for Producing the Same"

DISCLOSURE

Technical Problem

The present invention has been made in view of the above, and is directed to providing an aluminum pouch film for a secondary battery maintaining excellent chemical resistance, heat resistance, salt resistance and electrolyte liquid resistance that the pouch film even when the secondary battery is used under environments of high temperature, high salt, high humidity and ultraviolet rays, and a manufacturing method therefor.

Technical Solution

According to a first aspect of the present invention, there is provided an aluminum pouch film for a secondary battery, the film including an aluminum layer, an outer resin layer formed on a first surface of the aluminum layer, an inner resin layer formed on a second surface of the aluminum layer, and an adhesive layer for adhering the aluminum layer to the inner resin layer, wherein the outer resin layer includes a copolymer of polyamide and polyimide.

In one embodiment of the present invention, the polyamide and the polyimide are copolymerized in a molar ratio of 1:9 to 9:1 in the outer resin layer.

In one embodiment of the present invention, the outer resin layer and the aluminum layer are directly adhered without an adhesive layer between the two layers.

In one embodiment of the present invention, the outer resin layer and the aluminum layer have adhesive strength of 2 N/15 mm or greater after immersing a 5 cm×5 cm specimen of the outer resin layer into 85° C. seawater having a salt concentration of 3.5% for 24 hours.

According to a second aspect of the present invention, there is provided a method for manufacturing an aluminum pouch film for a secondary battery, the method including a) preparing an aluminum layer, b) forming an outer resin layer on a first surface of the aluminum layer and c) adhering the inner resin layer on a second surface of the aluminum layer, wherein the outer resin layer includes a copolymer of polyamide and polyimide.

Advantageous Effects

Using an aluminum pouch film for a secondary battery according to the present invention is capable of preventing a chemical reaction occurring when an aluminum layer is brought into contact with water including an electrolyte liquid or salt, and deformation of the pouch film occurring when exposed to stressful environments such as high temperature and ultraviolet rays, and accordingly, risks of expansion inside a battery due to generating a gas inside the battery or explosion by a high temperature can be reduced. In addition, micro-crack occurrences are prevented, which is preferred for increasing battery sizes for mass production of large capacity batteries used in electric vehicles, marine electric ships and the like, and safety for battery environments can be enhanced.

DESCRIPTION OF DRAWINGS

The FIGURE illustrates a structure of an aluminum pouch film for a secondary battery according to a preferred embodiment of the present invention.

BEST MODE

Embodiments provided according to the present invention may all be accomplished by the following descriptions. The following descriptions need to be understood as describing preferred embodiments of the present invention, and it is to be understood that the present invention is not necessarily limited thereto.

The present invention provides an aluminum pouch film for a secondary battery, the film including an aluminum layer; an outer resin layer formed on a first surface of the aluminum layer; an inner resin layer formed on a second surface of the aluminum layer; and an adhesive layer for adhering the aluminum layer to the inner resin layer, wherein the outer resin layer includes a copolymer of polyamide and polyimide.

Hereinafter, each constitution of the aluminum pouch film for a secondary battery of the present invention will be described in detail.

Aluminum Layer

In the film for a secondary battery packaging material of the present invention, aluminum or an aluminum alloy is suitable as a material of a metal thin film used as a barrier layer for preventing penetration of oxygen, moisture or the like from the outside. As the aluminum alloy, an alloy obtained by adding various metals and non-metals to pure aluminum or a stainless alloy may be used. As the aluminum layer, soft aluminum foil may be preferably used, and more preferably, iron-containing aluminum foil is used to provide formability to aluminum foil. As for the aluminum foil, series with high purity has excellent processability, and therefore, aluminum alloy foil in No. 1000 series or No. 8000 series is preferred. in addition, the aluminum base may optionally be an alloy including an atom selected from the group consisting of silicon, boron, germanium, arsenic, antimony, copper, magnesium, manganese, zinc, lithium, iron, chromium, vanadium, titanium, bismuth, potassium, tin, lead, zirconium, nickel, cobalt and combinations thereof. In the iron-containing aluminum foil, the iron may be included preferably in 0.1% by mass to 9.0% by mass and more preferably in 0.5% by mass to 2.0% by mass with respect to 100 of the total aluminum foil mass. When the iron content is less than 0.1% by mass in the aluminum foil, softness of the aluminum layer decreases, and the iron content being greater than 9.0% by mass causes a problem of declining formability. The aluminum foil used in the aluminum layer may have the surface etched or degreased in order to enhance adhesiveness with the inner resin layer, however, the treatment may be skipped to reduce the process speed. The aluminum layer is for preventing penetration of gas and water vapor into a battery from the outside, and the aluminum thin film is required to have no pin holes and processing suitability (pouching, emboss forming). The thickness is preferably from 10 μm to 100 μm, and is more preferably from 30 μm to 50 μm considering processability, oxygen and moisture barrier properties, and the like. Failing to satisfy the above-mentioned range has problems in that the aluminum layer is readily torn and has reduced electrolytic resistance and insulating properties when the thickness is less than 10 μm, and formability is reduced when the thickness is greater than 50 μm.

Outer Resin Layer

In the aluminum pouch film for a secondary battery of the present invention, the outer resin layer corresponds to a portion in direct contact with hardware, and therefore, is preferably a resin having insulating properties. Accordingly, as a resin used as the outer resin layer, polyester resins such as polyethylene terephthalate, polybutylene terephthalate, polyethylene naphthalate, polybutylene naphthalate, copolymerized polyester and polycarbonate may be included, or polyamide resins, polyimide resins or copolymers of polyamide and polyimide may be included. Preferably, copolymers of polyamide and polyimide may be included.

Specific examples of the polyester resin may include polyethylene terephthalate (PET), polybutylene terephthalate (PBT), polyethylene naphthalate (PEN), polybutylene naphthalate (PBN), copolymerized polyester, polycarbonate (PC) and the like. Specific examples of the polyester may include polyethylene terephthalate, polybutylene terephthalate, polyethylene naphthalate, polybutylene naphthalate, polyethylene isophthalate, polycarbonate, copolymerized polyester employing ethylene terephthalate as a repeating unit subject, copolymerized polyester employing butylene terephthalate as a repeating unit subject and the like. In addition, specific examples of the copolymerized polyester employing ethylene terephthalate as a repeating unit subject may include copolymer polyester polymerized with ethylene isophthalate employing ethylene terephthalate as a repeating unit subject, polyethylene (terephthalate/isophthalate), polyethylene (terephthalate/adipate), polyethylene (terephthalate/sodium sulfoisophthalate), polyethylene (terephthalate/sodium isophthalate), polyethylene (terephthalate/phenyl-dicarboxylate), polyethylene (terephthalate/decane dicarboxylate) and the like. In addition, examples of the copolymerized polyester employing butylene terephthalate as a repeating unit subject may include copolymer polyester polymerized with butylene isophthalate employing butylene terephthalate as a repeating unit subject, polybutylene (terephthalate/adipate), polybutylene (terephthalate/sebacate), polybutylene (terephthalate/decane dicarboxylate), polybutylene naphthalate and the like. These polymers may be used either alone as one type, or as a combination of two or more types.

Specific examples of the polyamide resin may include aliphatic-based polyamides such as nylon 6, nylon 66, nylon 610, nylon 12, nylon 46, and a copolymer of nylon 6 and nylon 66; aromatic group-including polyamides such as hexamethylenediamine-isophthalic acid-terephthalic acid copolymerized polyamide such as nylon 6I, nylon 6T, nylon 6IT and nylon 6I6T (I represents isophthalic acid, and T represents terephthalic acid) including structural units derived from terephthalic acid and/or isophthalic acid, and polymeta-xylene adipamide (MXD6); alicyclic-based polyamides such as polyaminomethylcyclohexyl adipamide (PACM6); or polyamides copolymerizing a lactam component and an isocyanate component such as 4,4'-diphenyl-methane-diisocyanate, polyesteramide copolymers or polyetheresteramide copolymers, which are copolymers of copolymerized polyamide and polyester or polyalkylene ether glycol; copolymers thereof, and the like. These polyamides may be used either alone as one type, or as a combination of two or more types.

The nylon film is mainly used as a packaging film by having excellent heat resistance, cold resistance and mechanical strength as well as having excellent disruptive strength, pin-hole resistance, gas barrier properties and the like. Specific examples of the nylon film may include polyamide resins, that is, nylon 6, nylon 66, a copolymer of nylon 6 and nylon 66, nylon 610, polymeta-xylene adipamide (MXD6) and the like. When laminating the outer resin layer, the laminated outer resin layer preferably has a thickness of 10 μm to 30 μm or greater, and particularly preferably has a thickness of 12 μm to 25 μm. Failing to satisfy the above-mentioned range has problems in that the outer resin layer is readily torn due to declined physical properties when the thickness is less than 10 μm, and formability is reduced when the thickness is greater than 30 μm.

The outer resin layer as above may preferably include a copolymer of polyamide and polyimide as a packaging film of a secondary battery.

Polyimide is classified as a general-purpose engineering plastic, and has excellent heat resistance, insulating properties, flexibility and non-flammability with no changes in the properties in a wide range of temperatures from 273 degrees below zero to 400 degrees above zero. Due to such properties, polyimide is used as a material in various fields such as space suits, mobile phone fuel cell cases, display and military devices, and the like. However, when using polyimide alone in the outer resin layer, adhesive strength decreases under environments of high temperature, high salt, high humidity and ultraviolet rays, and peeling or delamination is not prevented with a polyurethane-based adhesive. Accordingly, a copolymer of polyamide and polyimide may be included as the outer resin layer in order to resolve the problem of adhesive strength that polyimide films have.

In the outer resin layer, polyamide and polyimide may be copolymerized in a molar ratio of 1:9 to 9:1, preferably 3:7 to 9:1, more preferably 5:5 to 9:1 and even more preferably 6:4 to 8:2. In addition, the outer resin layer and the aluminum layer may be directly adhered without an adhesive layer between the two layers. When using polyimide alone as the outer resin layer, adhesive strength is low causing delamination under harsh environments such as high temperature, high salt and high humidity, however, the copolymer of polyamide and polyimide is capable of, while having excellent heat resistance, chemical resistance, formability and salt resistance, maintaining adhesive strength without delamination between the outer resin layer and the aluminum layer without a separate adhesive.

The outer resin layer and the aluminum layer may have adhesive strength of 2 N/15 mm or greater, preferably 3 N/15 mm and more preferably 5 N/15 mm or greater after immersing a 5 cm×5 cm specimen of the outer resin layer into 85° C. seawater having a salt concentration of 3.5% for 24 hours. As the outer resin layer has better salt resistance, adhesive strength between the outer resin layer and the aluminum layer may be maintained without decreasing.

Inner Resin Layer

In the aluminum pouch film for a secondary battery of the present invention, polyolefins such as polyethylene (PE) or polypropylene (PP), or copolymers thereof may be used as the inner resin layer. The inner resin layer is not particularly limited thereto, and is formed with a resin layer selected from the group consisting of, in addition to the polyolefin-based such as polyethylene, polypropylene and polybutylene, ethylene copolymers, propylene copolymers, polyester-based, polyamide-based, polycarbonate-based, fluorine-based, silicone-based, acryl-based, ethylene-propylene-diene-monomer rubber (EPDM) and mixtures thereof.

Preferably, a polyolefin-based resin layer or a composite resin layer of polybutadiene and polyolefin may be used.

Specific examples of the polyolefin used above may include polyethylene such as low-density polyethylene, medium-density polyethylene, high-density polyethylene or linear low-density polyethylene; polypropylene such as homopolypropylene, block copolymers of polypropylene (for example, block copolymer of propylene and ethylene) and random copolymers of polypropylene (for example, random copolymer of propylene and ethylene); a ternary copolymer of ethylene-butene-propylene; and the like. Among these polyolefins, polyethylene and polypropylene are preferably included.

Using a polyolefin such as polyethylene or polypropylene or a copolymer thereof in the inner resin layer is preferred since processability such as lamination is favorable as well as having properties required as a packaging material for a secondary battery such as favorable heat sealing properties, moisture-proof properties and heat resistance. The thickness of the polymer layer of the inner resin layer is preferably from 20 μm to 100 μm and more preferably from 30 μm to 80 μm considering formability, insulating properties, electrolyte liquid resistance and the like. Failing to satisfy the above-mentioned range may cause problems of reducing formability, insulating properties and electrolyte liquid resistance.

Adhesive Layer

The adhesive layer is a layer increasing adhesion between the inner resin layer-aluminum foil layer.

The adhesive layer may include one or more types of compounds selected from the group consisting of polyurethane resins, polyolefin resins and epoxy resins, or a mixture that is a modified product thereof. Specific examples of the adhesive may include maleic anhydride polypropylene (MAHPP) and the like.

Examples of the heat-adhesive olefin-based resin may include polyethylene, an ethylene-α-olefin copolymer, an ethylene-acrylic acid copolymer, an ethylene-methacrylic acid copolymer, an ethylene-acrylic acid ester copolymer, an ethylene-methacrylic acid ester copolymer, an ethylene-vinyl acetate copolymer, ionomers, polypropylene, maleic anhydride-modified polypropylene, an ethylene-propylene copolymer, a propylene-1-butene-ethylene copolymer and the like, and may preferably include one or more types of olefin-based resins selected from the group consisting of polypropylene, an ethylene-propylene copolymer and a propylene-1-butene-ethylene copolymer.

The polyolefin used for forming an adhesive layer may be acid-modified polyolefin. The acid-modified polyolefin used for forming the second adhesive layer is a polymer modified by graft polymerizing polyolefin with unsaturated carboxylic acid. Specific examples of the acid-modified polyolefin may include polyethylene such as low-density polyethylene, medium-density polyethylene, high-density polyethylene or linear low-density polyethylene; crystalline or amorphous polypropylene such as homopolypropylene, block copolymers of polypropylene (for example, block copolymer of propylene and ethylene) and random copolymers of polypropylene (for example, random copolymer of propylene and ethylene); a ternary copolymer of ethylene-butene-propylene, and the like. Among these polyolefins, polyolefins having at least propylene as a forming monomer are preferably included, and a ternary copolymer of ethylene-butene-propylene and a random copolymer of propylene-ethylene may be more preferably included in terms of heat resistance. Examples of the unsaturated carboxylic acid used for modification may include maleic acid, acrylic acid, itaconic acid, crotonic acid, maleic anhydride, itaconic anhydride and the like. Among these unsaturated carboxylic acids, maleic acid and maleic anhydride are preferably included. The acid-modified polyolefin may be used either alone as one type, or as a combination of two or more types.

The adhesive layer preferably has a thickness of 2 μm to 10 μm and more preferably 3 μm to 5 μm considering adhesiveness with the inner resin layer and thickness after forming. Failing to satisfy the above-mentioned range may cause problems in that adhesiveness decreases when the thickness is less than 2 μm, and cracks may occur when the thickness is greater than 5 μm.

When laminating the inner resin layer and the aluminum layer on the adhesive layer, the method is not particularly limited, however, a dry lamination method, a heat lamination method or an extrusion lamination method may be preferably used for the lamination.

Method for Manufacturing Aluminum Pouch Film for Secondary Battery

The present invention provides a method for manufacturing an aluminum pouch film for a secondary battery, the method including a) preparing an aluminum layer, b) forming an outer resin layer on a first surface of the aluminum layer and c) adhering the inner resin layer on a second surface of the aluminum layer, wherein the outer resin layer includes a copolymer of polyamide and polyimide.

a) Preparing Aluminum Layer

As the aluminum layer of the aluminum pouch film for a secondary battery of the present invention, soft aluminum foil may be preferably used, and aluminum foil including iron may be more preferably used in order to further provide pin-hole resistance and softness during cold forming. In the aluminum foil including iron, the iron may be preferably included in 0.1% by mass to 9.0% by mass and more preferably included in 0.5% by mass to 2.0% by mass with respect to 100% by mass of the whole aluminum foil. When the iron content is less than 0.1% by mass with respect to 100% by mass of the whole aluminum foil, softness of the aluminum layer decreases, and including the iron in greater than 9.0% by mass has a problem of reducing formability.

The thickness of the aluminum layer is preferably from 10 μm to 100 μm and more preferably from 30 μm to 50 μm considering pin-hole resistance, processability, oxygen and moisture barrier properties, and the like. Failing to satisfy the above-mentioned range may cause problems in that the aluminum layer is readily torn and electrolyte liquid resistance and insulating properties decline when the thickness is less than 10 μm, and formability becomes poor when the thickness is greater than 100 μm.

As the aluminum foil used in the aluminum layer, untreated aluminum foil may be used, however, using degreased aluminum foil is more preferred in terms of providing electrolysis liquid resistance, electrolyte liquid resistance and the like. As the degreasing treatment method, a wet-type or dry-type treatment method may be included.

Examples of the wet-type degreasing treatment may include acid degreasing or alkali degreasing. Examples of the acid used in the acid decreasing may include inorganic acids such as sulfuric acid, acetic acid, phosphoric acid and hydrofluoric acid, and the acid may be used either alone as one type, or as a combination of two or more types. In addition, when necessary, various metal salts may be mixed thereto in order to enhance an etching effect of the aluminum foil. Examples of the alkali used in the alkali degreasing may include strong alkalis such as sodium hydroxide, and a weak alkali type or a surfactant may also be mixed thereto.

Examples of the dry-type degreasing treatment may include a method of degreasing using a process of annealing aluminum at a high temperature.

b) Forming Outer Resin Layer on First Surface of Aluminum Layer

In the aluminum pouch film for a secondary battery of the present invention, the outer resin layer corresponds to a portion in direct contact with hardware, and therefore, is preferably a resin having insulating properties. Accordingly, as a resin used as the outer resin layer, polyester resins such as polyethylene terephthalate, polybutylene terephthalate, polyethylene naphthalate, polybutylene naphthalate, copolymerized polyester and polycarbonate may be included, or polyamide resins, polyimide resins or copolymers of polyamide and polyimide may be included. Preferably, copolymers of polyamide and polyimide may be included.

The outer resin layer as above may preferably include a copolymer of polyamide and polyimide as a packaging film of a secondary battery.

Polyimide is classified as a general-purpose engineering plastic, and has excellent heat resistance, insulating properties, flexibility and non-flammability with no changes in the properties in a wide range of temperatures from 273 degrees below zero to 400 degrees above zero. Due to such properties, polyimide is used as a material in various fields such as space suits, mobile phone fuel cell cases, display and military devices, and the like. However, when using polyimide alone in the outer resin layer, adhesive strength decreases under environments of high temperature, high salt, high humidity and ultraviolet rays, and peeling or delamination is not prevented with a polyurethane-based adhesive. Accordingly, a copolymer of polyamide and polyimide may be included as the outer resin layer in order to resolve the problem of adhesive strength that polyimide films have.

In the outer resin layer, polyamide and polyimide may be copolymerized in a molar ratio of 1:9 to 9:1, preferably 3:7 to 9:1, more preferably 5:5 to 9:1 and even more preferably 6:4 to 8:2. In addition, the outer resin layer and the aluminum layer may be directly adhered without an adhesive layer between the two layers. When using polyimide alone as the outer resin layer, adhesive strength is low causing delamination under harsh environments such as high temperature, high salt and high humidity, however, the copolymer of polyamide and polyimide is capable of, while having excellent heat resistance and chemical resistance, maintaining adhesive strength without delamination between the outer resin layer and the aluminum layer without a separate adhesive.

In forming the outer resin layer on a first surface of the aluminum layer of the aluminum pouch film for a secondary battery of the present invention, the copolymer of polyamide and polyimide is laminated using a dry lamination method or an extrusion lamination method to form the outer resin layer. When laminating the outer resin layer, the laminated outer resin layer preferably has a thickness of 10 μm to 30 μm or greater, and particularly preferably has a thickness of 12 μm to 25 μm. Failing to satisfy the above-mentioned range has problems in that the outer resin layer is readily torn due to declined physical properties when the thickness is less than 10 μm, and formability is reduced when the thickness is greater than 30 μm.

When laminating the outer resin layer, a drying lamination method or an extrusion lamination method may be, although not particularly limited thereto, preferably used to laminate the outer resin layer.

c) Adhering Inner Resin Layer on Second Surface of Aluminum Layer

In adhering an inner resin layer on a second surface of the aluminum layer of the aluminum pouch film for a secondary battery of the present invention, one or more types of compounds selected from the group consisting of polyurethane resins, polyolefin resins and epoxy resins, or a mixture that is a modified product thereof may be included as the adhesive layer for adhering the aluminum layer to the inner resin layer. Specific examples of the adhesive may include maleic anhydride polypropylene (MAHPP) and the like.

The thickness of the second adhesive layer is preferably from 2 μm to 30 μm and more preferably from 3 μm to 15 μm considering adhesiveness with the inner resin layer and thickness after forming. Failing to satisfy the above-mentioned range may cause problems in that adhesiveness decreases when the thickness is less than 2 μm, and cracks may occur when the thickness is greater than 30 μm.

When laminating the inner resin layer on the aluminum layer, a drying lamination method or an extrusion lamination method may be, although not particularly limited thereto, preferably used to laminate the inner resin layer.

Hereinafter, preferred examples are provided in order to illuminate the present invention, however, the following examples are provided only to more readily understand the present invention, and the present invention is not limited thereto.

EXAMPLE: MANUFACTURE OF POUCH FILM

Examples 1 to 5

In order to laminate an outer resin layer, a polyamide-polyimide copolymer film (Vylomax, Toyobo Co., Ltd.) having a thickness of 25 μm and having a different molar ratio as in Examples 1 to 5 of the following Table 1 was prepared first.

On a first surface of aluminum foil (product of Dong-il Aluminum Co., Ltd.) having a thickness of 40 μm, the polyamide-polyimide copolymer film having a thickness of 25 μm was dry laminated without a separate adhesive, and laminated as an outer resin layer. After that, in order to laminate an inner resin layer on a second surface of the aluminum foil, a maleic anhydride-modified polyolefin adhesive (product of HICHEM Co., Ltd.) was coated to a thickness of 4 μm, and cast polypropylene (product of Lotte Chemical (former Homan Petrochemical)) having a thickness of 40 μm was laminated on the aluminum using a dry lamination method to prepare pouch films of Examples 1 to 5.

TABLE 1

|  | Copolymerization Molar Ratio (Polyamide (PA):Polyimide (PI)) |
| --- | --- |
| Example 1 | 1:9 |
| Example 2 | 3:7 |
| Example 3 | 5:5 |
| Example 4 | 7:3 |
| Example 5 | 9:1 |
| Comparative Example | 10:0 |

Comparative Example

Instead of the process of laminating the polyamide-polyimide copolymer film on the aluminum without an adhesive as the outer resin layer, a polyurethane adhesive resin (product of HICHEM Co., Ltd.) having a thickness of 4 μm was coated using a gravure roll method on a first surface of aluminum foil (product of Dong-il Aluminum Co., Ltd.), and then a nylon 6 film (product of Hyosung) having a thickness of 25 μm was laminated through a dry lamination process as the outer resin layer.

A pouch film of Comparative Example was manufactured by conducting all processes in the same manner under the same condition as in Examples 1 to 5 except for this.

Experimental Example: Measurement of Young's Modulus, and Adhesiveness, Formability and Salt Resistance Evaluations (Measurement of Young's Modulus)

For the pouch film manufactured in each of Examples 1 to 5 and Comparative Example, Young's modulus was measured using a universal testing machine (Shimadzu AG-X), and the results are shown as in the following Table 2.

TABLE 2

|  | Young's Modulus (GPa) |
| --- | --- |
| Example 1 | 6.5 |
| Example 2 | 6.2 |
| Example 3 | 5.5 |
| Example 4 | 5.0 |
| Example 5 | 4.5 |
| Comparative Example | 4.2 |

Through the Young's modulus measurement results of Table 2, it was identified that the copolymer became firm and difficult to compress as the polymerization ratio of polyimide increased in the polyamide-polyimide copolymer, and force required to deform the polymer increased.

(Adhesiveness Evaluation)

For the pouch film manufactured in each of Examples 1 to 5 and Comparative Example, adhesiveness was evaluated by measuring adhesive strength (N/15 mm) between the polyamide-polyimide copolymer outer resin layer and the aluminum layer using a UTM apparatus (TESTONE Co., Ltd.) in accordance with the ASTM D882, and the results are shown in the following Table 3.

TABLE 3

|  | Adhesive Strength (N/15 mm) |
| --- | --- |
| Example 1 | 2 |
| Example 2 | 2 |
| Example 3 | 3 |
| Example 4 | 5 |
| Example 5 | 5.5 |
| Comparative Example | 6 |

(Formability Evaluation)

For the pouch film manufactured in each of Examples 1 to 5 and Comparative Example, forming was conducted while changing the forming depth by 0.1 mm using a cold drawing punching method (mold size: 5 cm*6 cm), and after crack occurrences were measured, the results are shown in the following Table 4.

Determination of crack occurrences was identified through occurrences of microcracks by flashing light on the formed product in a dark room and observing leaking light using a microscope. Formability was evaluated through this by employing the forming depth when cracks did not occur as a limit forming depth.

TABLE 4

|  | Limit Forming Depth (mm) |
| --- | --- |
| Example 1 | 2.0 |
| Example 2 | 3.0 |
| Example 3 | 4.0 |
| Example 4 | 6.0 |
| Example 5 | 6.2 |
| Comparative Example | 6.5 |

(Salt Resistance Evaluation)

The pouch film specimen of 5 cm*5 cm manufactured in each of Examples 1 to 5 and Comparative Example was immersed into 85° C. seawater having a salt concentration (composition ratio of components is as shown in Table 5) of 3.5% for 24 hours. After 24 hours, the pouch film specimen was taken out, and adhesiveness was evaluated by measuring adhesive strength (N/15 mm) between the polyamide-polyimide copolymer outer resin layer and the aluminum layer using a UTM apparatus (TESTONE Co., Ltd.) in accordance with the ASTM D882, and the results are shown in the following Table 6.

TABLE 5

|  | Composition Ratio of Each Component (mol/kg) |
| --- | --- |
| $H_2O$ | 53.6 |
| $Na^+$ | 0.46 |
| $Mg^{2+}$ | 0.053 |
| $Ca^{2+}$ | 0.01 |
| $K^+$ | 0.01 |

TABLE 6

|  | Adhesive Strength (N/15 mm) |
| --- | --- |
| Example 1 | 2 |
| Example 2 | 2 |
| Example 3 | 3 |
| Example 4 | 5 |
| Example 5 | 2 |
| Comparative Example | 1 |

Through the evaluations of adhesiveness, formability and salt resistance according to Tables 3, 4 and 6, it was identified that Example 4 having a polyamide-polyimide polymerization ratio of 7:3 was able to be used as the outer resin layer having, while having excellent adhesiveness and formability, adhesiveness maintained even under harsh conditions of high temperature and high salt.

Simple modifications and variations of the present invention all fall within the category of the present invention, and the specific protection scope of the present invention will become obvious from the appended claims.

The invention claimed is:

1. An aluminum pouch film for a secondary battery, the film comprising:
   an aluminum layer;
   an outer resin layer formed on a first surface of the aluminum layer;
   an inner resin layer formed on a second surface of the aluminum layer; and
   an adhesive layer for adhering the aluminum layer to the inner resin layer,
   wherein the outer resin layer includes a copolymer comprising a polyamide unit and a polyimide unit, wherein the outer resin layer and the aluminum layer are directly adhered without an adhesive layer between the outer resin layer and the aluminum layer.

2. The aluminum pouch film for a secondary battery of claim 1, wherein the copolymer comprises the polyamide unit and the polyimide unit at a molar ratio of 1:9 to 9:1.

3. The aluminum pouch film for a secondary battery of claim 1, wherein the outer resin layer and the aluminum layer have adhesive strength of 2 N/15 mm or greater after immersing a 5 cm×5 cm specimen of the aluminum pouch film into 85° C. saline water having a salt concentration of 3.5% for 24 hours.

4. A method for manufacturing the aluminum pouch film for a secondary battery of claim 1, the method comprising:
   a) preparing an aluminum layer;
   b) forming an outer resin layer on a first surface of the aluminum layer; and
   c) adhering the inner resin layer on a second surface of the aluminum layer,
   wherein the outer resin layer includes a copolymer of comprising a polyamide unit and a polyimide unit,
   wherein the outer resin layer and the aluminum layer are directly adhered without an adhesive layer between the outer resin layer and the aluminum layer.

5. The method of claim 4, wherein the copolymer comprises the polyamide unit and the polyimide unit at a molar ratio of 1:9 to 9:1.

6. The method of claim 4, wherein the outer resin layer and the aluminum layer have adhesive strength of 2 N/15 mm or greater after immersing a 5 cm×5 cm specimen of the aluminum pouch film into 85° C. saline water having a salt concentration of 3.5% for 24 hours.

* * * * *